W. F. RACHAL.
TRUCK.
APPLICATION FILED MAR. 27, 1908.

908,327.

Patented Dec. 29, 1908.

2 SHEETS—SHEET 1.

Witnesses
E. H. Callaghan
J. Middleton

Inventor
WILLIAM F. RACHAL
By Munn & Co.
Attorney

W. F. RACHAL.
TRUCK.
APPLICATION FILED MAR. 27, 1908.
908,327.
Patented Dec. 29, 1908.
2 SHEETS—SHEET 2.
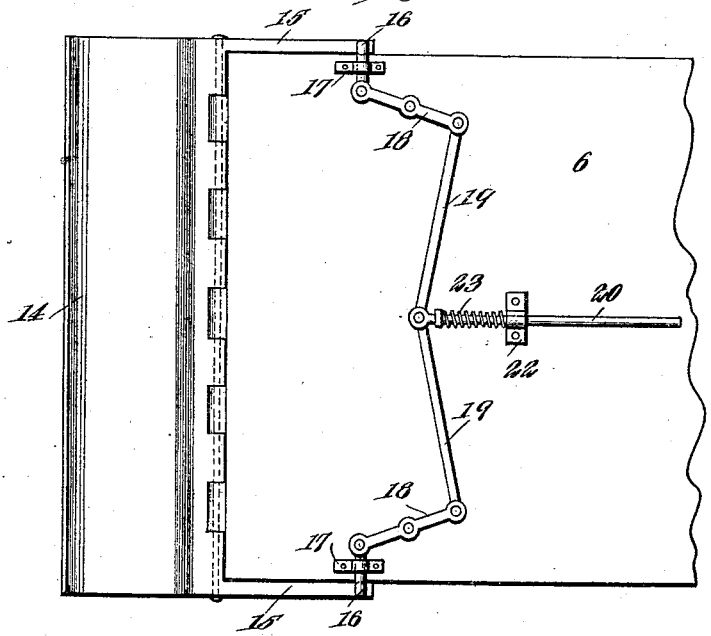
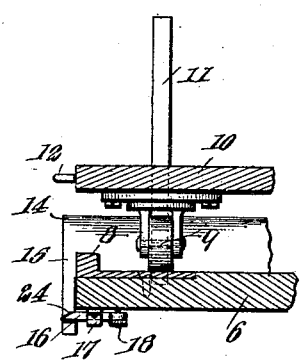
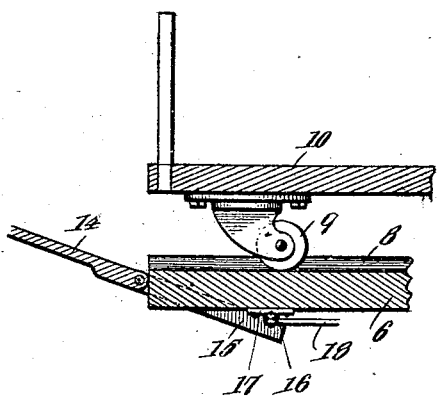
Witnesses
Inventor
WILLIAM F. RACHAL
By Attorney

UNITED STATES PATENT OFFICE.

WILLIAM F. RACHAL, OF LAKE CHARLES, LOUISIANA.

TRUCK.

No. 908,327.　　Specification of Letters Patent.　　Patented Dec. 29, 1908.

Application filed March 27, 1908.　Serial No. 423,564.

*To all whom it may concern:*

Be it known that I, WILLIAM F. RACHAL, a citizen of the United States, residing at Lake Charles, Calcasieu parish, and State of Louisiana, have invented a new and useful Improvement in Trucks, of which the following is a specification.

This invention relates to trucks particularly adapted for loading and unloading express and baggage upon and from cars and wagons, more especially cars.

The invention includes or comprises a main truck, and an upper or platform truck mounted thereon, and the articles can be loaded on the latter and rolled from the truck to the car or vice versa at a single operation without handling every piece or article individually, the loaded or unloaded main truck being backed up to the car door so that the upper or platform truck can be rolled on or off the same without being unloaded.

The invention furthermore includes an improved bridge piece at the end of the main truck, to lap from the truck to the car sill so that the upper truck can be rolled on or off.

The invention is illustrated in the accompanying drawings, in which—

Figure 1:
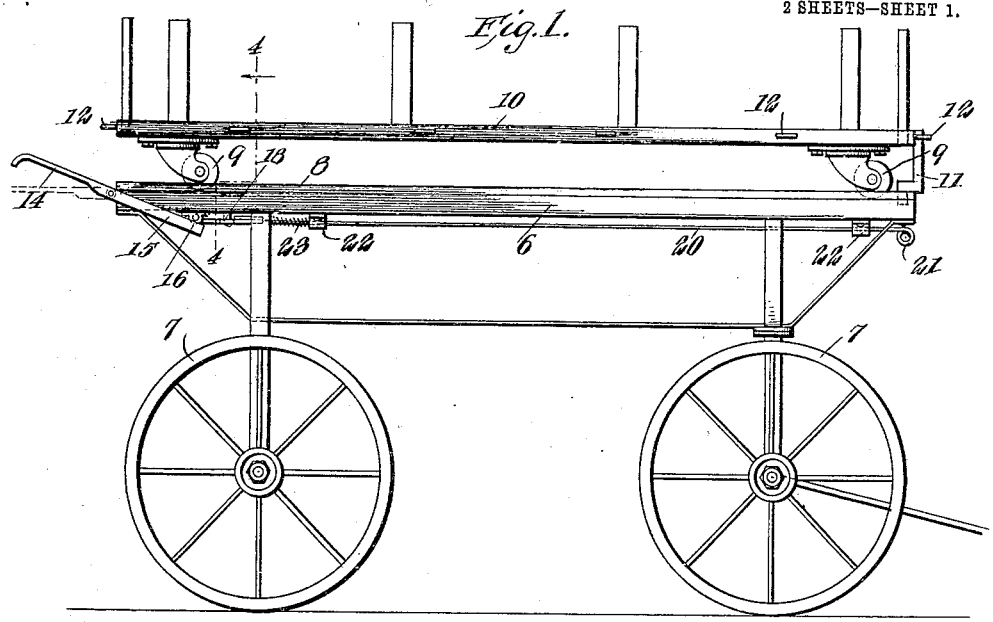
Figure 2:
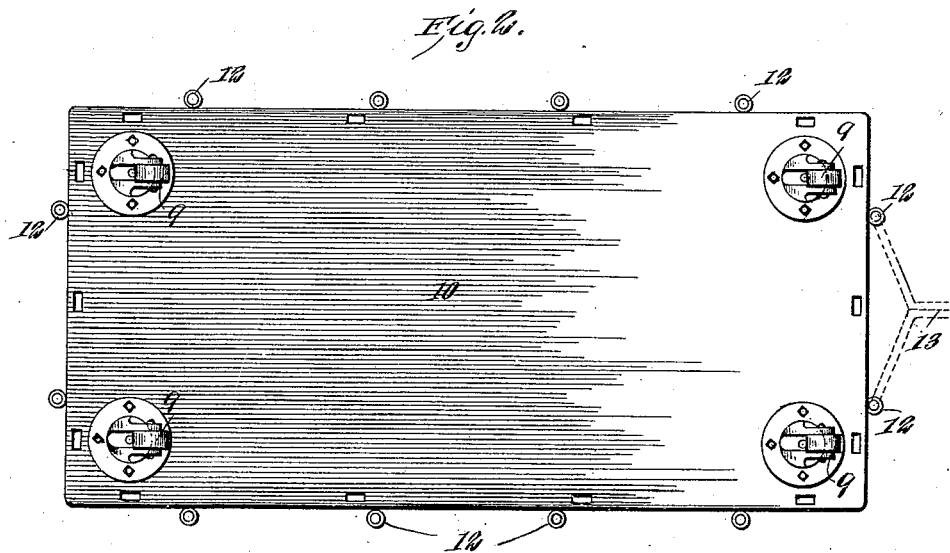

Figure 1 is a side elevation of the whole truck. Fig. 2 is a bottom view of the platform or upper truck. Fig. 3 is an inverted plan showing the underside of the bridge piece and the end of the main truck. Figs. 4 and 5 are details in cross and longitudinal section of the upper and lower truck platforms.

In the drawings, 6 indicates the top of a main or standard truck which is mounted on wheels 7 and which will be conveniently of the same height as the floor of a car, as standard trucks are usually made. This top has a rail 8 at each side edge, to receive and retain the caster wheels 9 of the upper or platform truck 10; and the latter may be held in place by removable standards 11 adapted to fit in sockets in the ends of the platform of the main truck. The upper truck is provided around its edge with a series of eyes 12 adapted to receive a detachable handle 13 which has branches the ends of which can be hooked into any pair of eyes, whereby the truck can be pulled or pushed in any desired direction and handled from either end or either side, whereby it can be rolled on or off the main truck and to and from the car as necessary.

At its rear end the main truck has an end or bridge piece 14, hinged to the end of the truck and provided at each side with arms or extensions 15 which project inwardly beside the side edges of the platform 6 of the truck. When the end piece is in raised position, as shown in Fig. 4, the inner ends of the arms engage under the ends of bolts 16 which slide in brackets 17 on the under side of the truck top. These bolts are pivotally connected to levers 18 which are connected by toggle links 19 to a rod 20 which extends under the truck top to the front end thereof where it is provided with a handle 21. The rod is supported and guided by suitable straps 22 and the bolts are normally projected by a coiled spring 23 between one of the straps and the toggle links. The ends of the bolts are beveled as at 24, so that the arms will snap down thereunder when the end piece is lifted. When in raised position, the end piece serves as a gate to hold the platform truck on the main truck. When the truck is backed up to a car or the like the end piece may be dropped to bridge the space by pulling on the rod 20 which retracts the bolts and allows the piece to drop onto the car sill. Then the platform truck with its load can be rolled on or off the main truck without handling the articles piece by piece.

I claim—

1. A truck, caster wheels on which the truck is mounted, a series of eyes around the edges of the truck, and a detachable handle adapted for engagement with any of said eyes, to haul the platform in any direction.

2. A truck having a hinged bridge piece at one end, devices to hold said piece in raised position, and means extending to the opposite end of the truck to release said holding devices and allow the bridge piece to drop.

3. A truck having a hinged bridge piece at one end of the platform thereof, said piece having inwardly extending arms at the sides of the platform, bolts movable in and out to release or engage said arms and means extending to the front end of the platform to operate said bolts.

4. A truck having a hinged bridge piece at the end of the platform thereof, said piece having inwardly extending arms at the side of the platform, spring-actuated bolts mounted on the platform and movable in and out to release or engage said arms, the ends of the bolts being beveled to yield under pressure by the arms, and means to simultaneously retract the bolts to release the arms.

WILLIAM F. RACHAL.

Witnesses:
 ROBT. P. HOWELL,
 I. C. CARTER.